(12) United States Patent
Holemans et al.

(10) Patent No.: US 11,565,833 B2
(45) Date of Patent: Jan. 31, 2023

(54) RECOVERY OF A FINAL STAGE OF A SPACECRAFT LAUNCH VEHICLE

(71) Applicant: Planetary Systems Corporation, Silver Spring, MD (US)

(72) Inventors: Walter Holemans, Washington, DC (US); Ryan Williams, San Diego, CA (US)

(73) Assignee: Planetary Systems Corporation, Silver Spring, MD (US)

( * ) Notice: Subject to any disclaimer, the term of this patent is extended or adjusted under 35 U.S.C. 154(b) by 265 days.

(21) Appl. No.: 17/015,568

(22) Filed: Sep. 9, 2020

(65) Prior Publication Data

US 2021/0070480 A1    Mar. 11, 2021

Related U.S. Application Data

(60) Provisional application No. 62/898,494, filed on Sep. 10, 2019.

(51) Int. Cl.
*B64G 1/62* (2006.01)
*B64G 1/58* (2006.01)
*B64G 1/64* (2006.01)
*B64G 1/00* (2006.01)

(52) U.S. Cl.
CPC ............... *B64G 1/62* (2013.01); *B64G 1/002* (2013.01); *B64G 1/58* (2013.01); *B64G 1/641* (2013.01)

(58) Field of Classification Search
CPC ........................................................ B64G 1/62
See application file for complete search history.

(56) References Cited

U.S. PATENT DOCUMENTS

| | | | | |
|---|---|---|---|---|
| 3,092,027 A * | 6/1963 | Price | ....................... | F42B 15/36 89/1.819 |
| 3,313,112 A * | 4/1967 | Reichert | ................... | B64G 1/62 244/171.1 |
| 3,432,125 A * | 3/1969 | Schroeder, Jr. | .......... | B64G 1/14 244/130 |
| 4,830,314 A * | 5/1989 | Hujsak | .................... | B64G 1/401 244/171.1 |
| 4,832,288 A * | 5/1989 | Kendall | ................... | F42B 10/50 244/113 |
| 5,328,132 A * | 7/1994 | Shelby, Jr. | ................ | B64G 1/62 244/129.1 |

(Continued)

FOREIGN PATENT DOCUMENTS

FR    2940248 A1 *    6/2010    ............. B64G 1/002

*Primary Examiner* — Joseph W Sanderson
(74) *Attorney, Agent, or Firm* — Robert M. McDermott

(57) ABSTRACT

After deploying its payload, the final stage of a launch vehicle is maneuvered to couple the nosecone of the launch vehicle to the 'rear', or 'engine-end' of the final stage. The nosecone covers the engine of the final stage, to protect the engine and related components from the heat of re-entry and the impact of landing. Placing the nosecone over the engine and orienting the combination such that the nosecone 'leads' the final stage during re-entry, places the center of gravity of the combination ahead of the center of pressure in the direction of travel. Accordingly, the combination is inherently stable as it re-enters the atmosphere and falls to earth. Parachutes and directional devices are used to provide a controlled soft landing.

52 Claims, 3 Drawing Sheets

(56) References Cited

U.S. PATENT DOCUMENTS

| | | | | |
|---|---|---|---|---|
| 6,059,234 A * | 5/2000 | Mueller | ............... | B64G 1/14 244/129.4 |
| 6,076,771 A * | 6/2000 | Bailey | ............... | B64G 1/62 244/158.9 |
| 7,344,111 B2 * | 3/2008 | Janeke | ............... | F02K 9/42 244/158.9 |
| 7,690,601 B2 * | 4/2010 | Janeke | ............... | B64G 1/14 244/158.9 |
| 8,006,936 B1 * | 8/2011 | Farr, III | ............... | A63H 27/005 244/151 B |
| 8,215,589 B2 * | 7/2012 | Janeke | ............... | B64G 1/62 244/158.9 |
| 9,487,308 B2 * | 11/2016 | Featherstone | ............... | B64G 1/14 |
| 10,569,908 B1 * | 2/2020 | Coyne | ............... | B64G 1/002 |
| 2008/0217481 A1 * | 9/2008 | Janeke | ............... | B64G 1/62 244/171.1 |

* cited by examiner

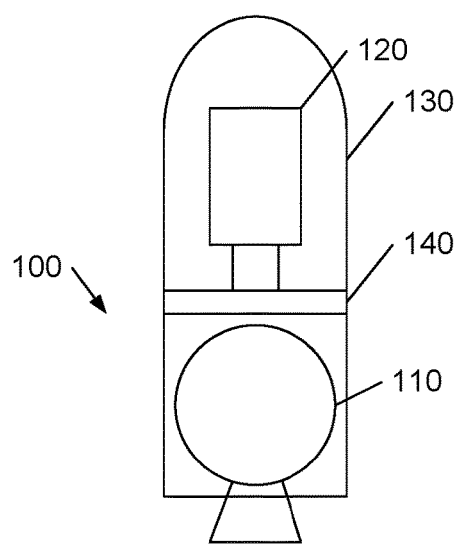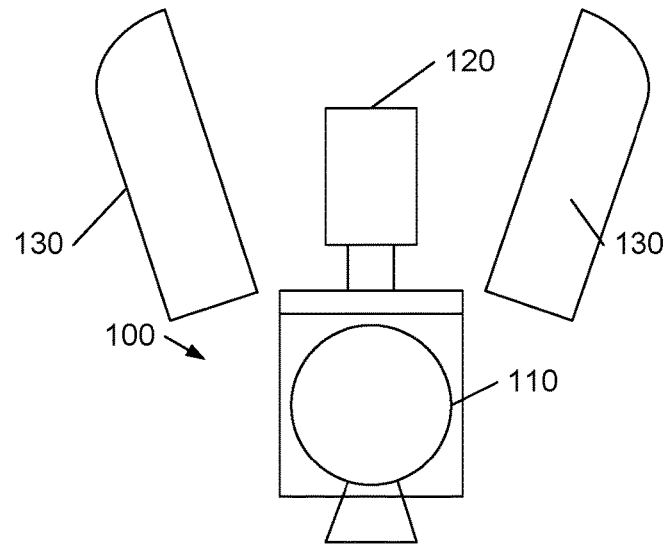
FIG. 1A  FIG. 1B
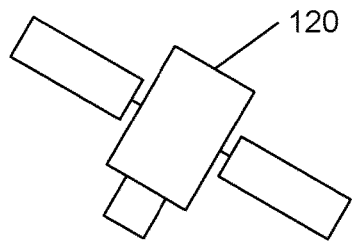
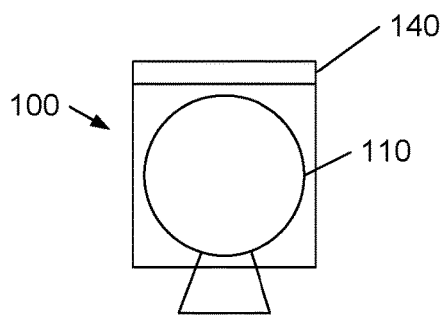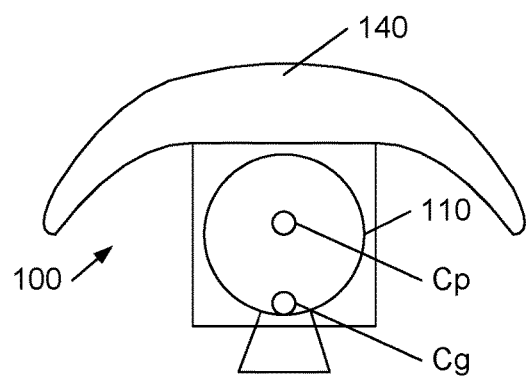
FIG. 1C  FIG. 1D
PRIOR ART

RECOVERY OF A FINAL STAGE OF A SPACECRAFT LAUNCH VEHICLE

This application claims the benefit of U.S. Provisional Patent Application 61/898,494, filed 10 Sep. 2019.

BACKGROUND AND SUMMARY OF THE INVENTION

This invention relates to the field of spacecraft and launch vehicles, and in particular to a system and method for recovering the final stage of a launch vehicle after deployment of the payload spacecraft(s).

In December 2015, SpaceX successfully demonstrated the feasibility of the long-sought goal of recovering major components of a launch vehicle, with the launch of Falcon 9 and the successful landing of its initial stage (aka 'rocket'). In February 2018, SpaceX launched the Falcon Heavy, and successfully landed two of its 3 booster rockets. As of mid-2020, SpaceX has successfully recovered the rockets of 55 launch vehicles, and has re-flown 37 of these recovered rockets.

The successful recovery of the final stage of a launch vehicle has yet to be demonstrated, although simulations have shown many proposed designs to be potentially feasible.

There are many obstacles to be overcome in order to successfully recover the final stage of a launch vehicle, primarily due to the physical nature of the launch vehicle and the speed at which the final stage must operate to successfully deploy its payload, which typically requires being at a minimum velocity to remain in orbit when released. In relative terms, the maximum velocity of the final stage can be as much as 5-20 times the maximum velocity of the first stage, thereby requiring additional fuel to decelerate to a re-entry velocity.

Since the primary purpose of the launch vehicle is typically to place an object in orbit, a certain minimum amount of fuel is required to provide the acceleration of the payload (and the final stage) to the required orbital velocity. Any additional fuel carried aboard the final stage for recovery operations has a substantial impact on the maximum payload mass that the final stage can carry.

Additionally, since the primary purpose of recovering the final stage is to enable the reuse of the rather expensive components in the final stage, such as the fuel tank, the propulsion and maneuvering jets and their associated electronic and mechanic components, etc. A successful recovery will require either a powered control landing, as is used in the recovery of the first stage rockets, which would require additional fuel in the final stage, or, it will require specialized configurations of the final stage to withstand a non-powered, or a maneuvering-only powered, 'soft' landing without damaging the components of the final stage.

FIGS. 1A-1D illustrate a prior art concept for providing recovery of a final stage of a launch vehicle.

FIG. 1A illustrates the final stage 100 of a launch vehicle, with a payload 120 enclosed in a fairing 130. The final stage 100 includes a fuel tank and jet(s), collectively referred to as an engine 110; not illustrated are the various components that control the engine 110 to maneuver the final stage. As detailed further below, to facility re-entry of the final stage 100, a deployable heat shield 140 is situated between the engine 110 and the payload 130.

To deploy the payload 120, the fairing 130 is released (FIG. 1B), then the payload 120 is released (FIG. 1C), typically after some maneuvering by the engine 110 to situate the payload 120 at its intended orbit.

When the payload 120 is released, the deployable heat shield 140 is exposed (FIG. 1C), and can be deployed (FIG. 1D) when the payload 120 is sufficiently out of range. Either before or after deployment of the heat shield 140, the engine 110 orients the final stage 100 so that when the engine 110 fires, the final stage 100 will decelerate, eventually causing the final stage 100 begin to fall to earth under the force of gravity. The engine 110 maneuvers the final stage 100 such that the heatshield 140 enters the atmosphere first, to protect the final stage 100 from the heat of re-entry.

As illustrated in FIG. 1D, with a relatively empty fuel tank, and a relatively heavy jet at the rear of the final stage 100, the center of pressure (Cp) will be ahead of the center of gravity (Cg), relative to the direction of travel, when the heat shield 140 is the lead element of the final stage 100. With the Cp ahead of the Cg during re-entry, the final stage 100 will be unstable as it enters the atmosphere, because the force of gravity will attempt to 'flip' the final stage 100 to situate the Cg ahead of the Cp. Consequently, the engine 110 must be continuously used to keep the heatshield 140 oriented properly to protect the final stage 100.

Once the heatshield 140 is no longer needed to absorb/deflect the re-entry heat, the engine 110 can cease operation, allowing gravity to flip the final stage 100 to place the Cg ahead of the Cp, such that the engine 110 is the lead element as the final stage 100 descends. Depending upon the particular design of the heatshield 140, it may be further deployed as a parachute to slow the descent of the final stage 100. Optionally, if sufficient fuel remains, the engine 110 can be used to provide a controlled landing; or, additional parachutes may be deployed to provide a 'soft' landing.

If, as is likely, a soft landing is implemented, some precautions need to be taken to avoid or minimize damage to the engine 110. A traditional water-based landing would require some deployable floatation devices. For land-based landings, a large net to 'catch' the final stage has been proposed. Also proposed is a "bouncy-house" approach, wherein multiple balloons are deployed, surrounding the final stage 100, such that when the balloons strike the earth, the final stage 100 is cushioned from the impact, and the final stage 100 with balloons bounces and rolls until it eventually comes to rest.

It would be advantageous to provide a system and method for recovering the final stage of a launch vehicle that overcomes at least some of the above mentioned difficulties.

These advantages, and others, can be realized by providing a multi-purpose nosecone on the final stage, wherein the nosecone is configured to be the lead component as the final stage leaves and re-enters the atmosphere. After deploying the payload, the nosecone and/or the final stage are maneuvered to couple the nosecone to the final stage. However, instead of placing the nosecone at the opposite end from the engine, the nosecone is placed at the engine-end, and serves to protect the engine and related components as the final-stage re-enters the atmosphere. By placing the nosecone at the engine-end of the final stage and using the nosecone as the lead component on re-entry, the center of gravity is ahead of the center of pressure in the direction of travel, and is thereby inherently stable, avoiding the need to consume fuel to continually control the orientation of the final stage during re-entry. Preferably, the final stage, with nosecone, also includes features that facilitate a controlled soft landing.

BRIEF DESCRIPTION OF THE DRAWINGS

The invention is explained in further detail, and by way of example, with reference to the accompanying drawings wherein:

FIGS. 1A-1D illustrate an example prior-art concept for recovery of a final stage of a launch vehicle.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

In the following description, because the components that are attached/included in the final stage of the launch vehicle change with time, the term 'spacecraft' will be used to refer to the final stage composition at the time that the term is used. That is, for example, at launch, the 'spacecraft' comprises the engine, the fairing, the payload, the nosecone, etc. and associated components. After deployment of the payload, the 'spacecraft' comprises the engine with attached nosecone, perhaps some fairing, etc. and associated components.

FIGS. 2A-2D illustrate an example embodiment of a recovery system for a final stage spacecraft 200 of a launch vehicle that incorporates features of this invention.

Figure 2A:
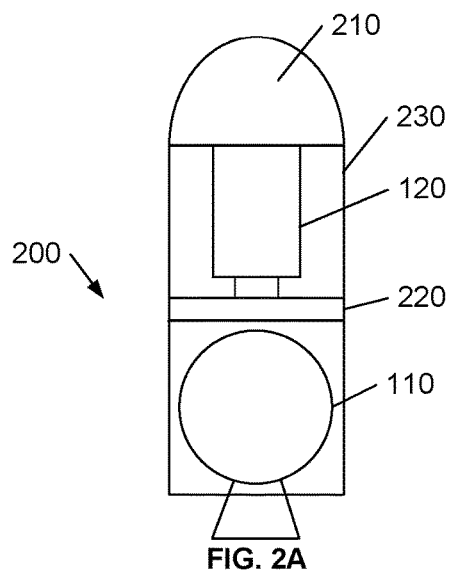
FIGS. 2A-2D illustrate an example embodiment of a recovery system for a final stage of a launch vehicle that incorporates features of this invention.

As illustrated in FIG. 2A, the spacecraft 200 after separation from the initial stage(s), primarily comprises an engine 110 and payload 120 as in the prior art example of FIG. 1A. However, in this example embodiment, a separate nosecone 210 and fairing 230 are illustrated, as well as an auxiliary component 220.

Figure 2B:
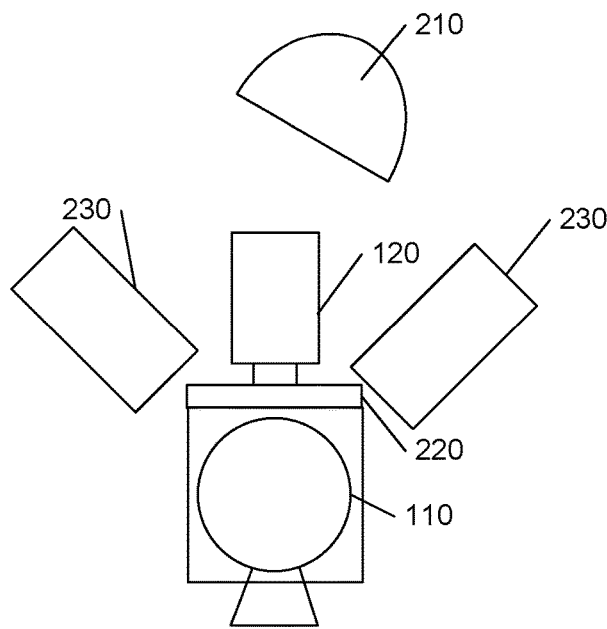

As illustrated in FIG. 2B, at some point (typically when the spacecraft 200 has reached its intended deployment velocity), the spacecraft 200 will release the nosecone 210 and fairing 230, to facilitate deployment of the payload 120. Any of a variety of techniques may be used to release these components, including, for example, explosive bolts, or preferably a non-explosive mechanically operated 'Lightband', as described in U.S. Pat. Nos. 6,227,493, 6,343,770, and 6,390,416, issued 6 Apr. 1999, 4 May 2001, and 28 Sep. 2001 respectively.

Figure 2C:
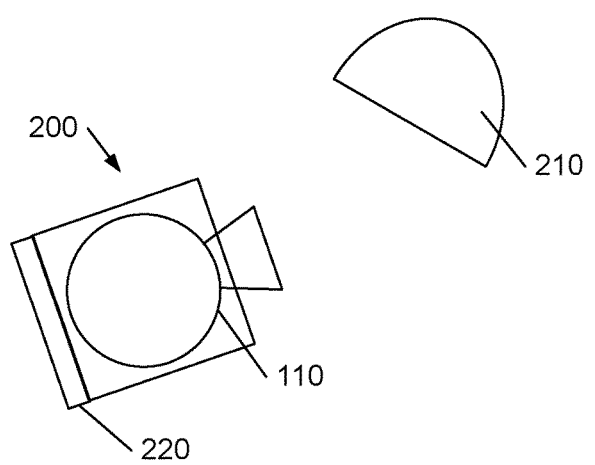

As illustrated in FIG. 2C, after deploying the payload 120, the engine 110 portion of the spacecraft 200 is maneuvered to the location of the nosecone 210. The maneuvering may be performed by controlled activation of thrusters of the engine 110, using well known techniques in the art, similar to the control of unmanned spacecraft to couple to the Space Station. The nosecone 210 may be configured to contain sensors and transmitters, or other devices that facilitate the maneuvering and coupling of the engine section of the spacecraft 200 to the nosecone 210. The spacecraft 200 and nosecone 210 will include conventional components, including the aforementioned Lightband, that provide for a secure coupling of the nosecone 210 to the spacecraft 200 at the engine-end of the spacecraft 200.

Figure 2D:
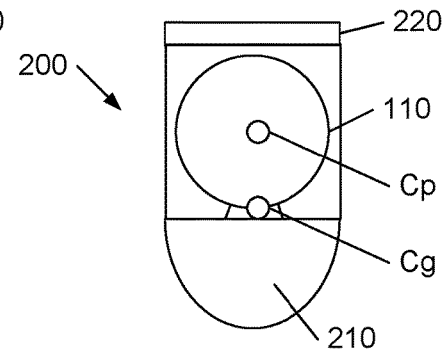

FIG. 2D illustrates the spacecraft 200 with the nosecone 210 situated at the engine-end of the spacecraft 200. In the recovery process, the nosecone 210 will be the lead element of the spacecraft 200 as the spacecraft enters the atmosphere and subsequently falls to earth. In an example embodiment, the auxiliary component 220 may include thrusters coupled to the engine 110 to orient the spacecraft 200 appropriately.

Of particular note, with the orientation of the spacecraft 200 in the engine-end down orientation of FIG. 2D, the center of gravity Cg is ahead (in the direction of travel) of the center of pressure Cp. Consequently, the spacecraft 200 in this orientation is stable, and the need for continual orientation control as in the prior art of FIG. 1D, is substantially eliminated. The thrusters of the auxiliary component 220 will only be activated intermittently to adjust for atmospheric effects and the like, thereby eliminating the need to carry enough fuel in the final stage of the launch vehicle to provide continual control of the orientation/attitude during re-entry.

Because the nosecone 210 will be the lead component of the spacecraft 200 as it re-enters the atmosphere, it comprises suitable heat-shielding material, and may include a deployable heat shield as in the prior-art concept of FIG. 1D. If a water-based recovery is used, the nosecone 210 or auxiliary component 220 may include deployable flotation devices.

The auxiliary component 220 will also contain elements that facilitate a soft landing of the spacecraft 200 after it re-enters the atmosphere. Such equipment may include, for example, parachutes. The equipment may also include deployable panels that fan out from the spacecraft to decrease the rate of descent and potentially control the direction of the spacecraft 200, similar in concept to a gyroscope, or the auto-rotation of helicopter blades when the helicopter engine fails.

If parachutes are used to decrease the decent velocity of the spacecraft, they may also be deployed from the nosecone 210. When the parachute inflates, it moves the center of pressure Cp further behind the center of gravity Cg. When deployed from the nosecone 210, the parachute will cause the spacecraft 200 to flip to an engine-up orientation, while still maintain a stable state of having the center of gravity Cg ahead of the center of pressure Cp. This orientation may also enable the use of thrusters in the auxiliary equipment 220 to further control the descent, as in the recovery of the initial stage(s) of the launch vehicle.

As illustrated in these Figures, the nosecone 210 comprises only the dome-shaped element. However, one of skill in the art will recognize that the nosecone 210 can be any shape that enables it to cover the external components of the engine-end of the spacecraft 200. In an example embodiment, the nosecone 210 may include some or all of the fairing 230, and the spacecraft 200 is configured to release this extended nosecone without impacting the payload. In an embodiment, the fairing 230 may comprise 'impact absorbing' material that absorbs the remaining kinetic energy of the spacecraft when it lands. The impact absorbing material typically crushes upon impact to minimize the effects of the impact on the recovered engine 110, similar to the impact absorbing components of automobiles that protect the occupants from impact.

Figure 3A:
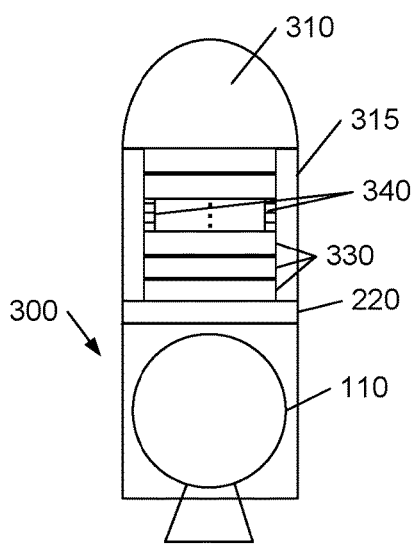
FIGS. 3A-3D illustrate another example embodiment of a recovery system for a final stage of a launch vehicle that incorporates features of this invention.

FIGS. 3A-3D illustrate another example embodiment of a recovery system for a final stage of a launch vehicle that incorporates features of this invention. FIG. 3A illustrates a final stage 300 comprising a plurality of payload elements 330. This example embodiment is based on a design described in co-pending U.S. patent application Ser. No. 16/511,864, "SYSTEM AND METHOD TO ATTACH AND REMOVE SPACECRAFT", filed 15 Jul. 2019 for Walter Holemans and Ryan Williams, which is incorporated by reference herein. In this embodiment, the payload elements 330 are secured in the final stage using threaded rods 340 (typically, four rods). These threaded rods 340 are turned by motors (not illustrated) and each payload element includes a means for selectively engaging the threads. Before launch, the threaded rods are screwed into each payload element 330 and tightened to preload the elements 330. The threaded rods 340 are then screwed into the final stage spacecraft 300 and preloaded.

The threaded rods 340 may be hollow to allow the routing of conduits that carry gases, propellants, electric power and signals, etc. The threaded rods 340 may be sectional, wherein each segment is screwed into the preceding section, thereby avoiding having to thread each component along the entire length of the finished threaded rod. The threaded rods 340 may also be coupled to motors at both ends to enable the securing of the payload elements 330 before the nose-cone is installed, and to enable the nosecone to deploy the payload elements 330, as detailed further below.

The rods 340 may also extend from the launch platform to the nose cone, to facilitate a 'vertical assembly' of the launch vehicle. For example, the launch vehicle could be assembled in a missile silo with a vertical elevator. The elevator would be raised to ground level to enable assembly of each component at that level, then progressively lowered as each component is added. A temporary shelter may be provided at the ground level to facilitate this assembly process in a protective environment. To launch the assembled launch vehicle, the elevator is raised to ground level, and either launched in place or transported to a launch pad. If the rods 340 are sectional, the section that couples the engine to the launch platform can be removed by 'unscrewing' the rod while securing the section above this section. This assembly process avoids the need to assemble the launch vehicle horizontally, then erected vertically. This assembly process will also likely result is a lighter launch vehicle by eliminating the structural requirements related to the horizontal assembly and vertical erection process.

Figure 3B:
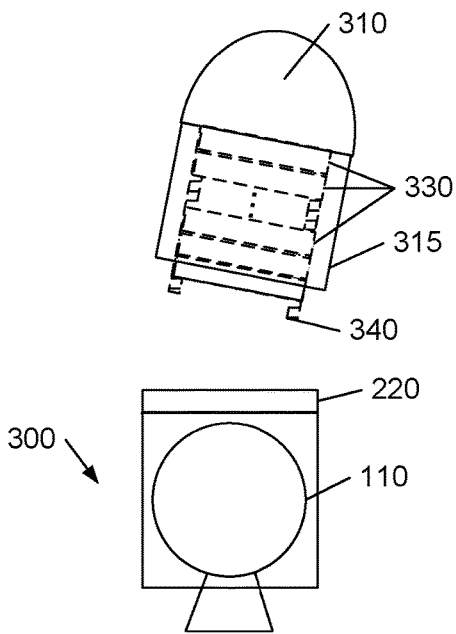

FIG. 3B illustrates the deployment of the nosecone 310 from the spacecraft 300. This is accomplished by having the nosecone 310 unscrew the rods 340 then backing the spacecraft 300 away, using any of the known techniques for deploying elements from the final stage of a launch vehicle. As detailed above, for example, the auxiliary component 220 may include thrusters that can be used to back the spacecraft away from the nosecone 310. In another example embodiment, the coupling of the nosecone 310 to the spacecraft 300 could include the use of springs that are compressed when the rods 340 of the nosecone 310 are tightened against the spacecraft 300. Upon release of the rods 340 from the spacecraft 300, these springs will exert pressure on the nosecone 310 to expel it from the spacecraft 300.

Also illustrated in this example embodiment is the inclusion of some or all of the fairing 315 with the nosecone 310, as discussed above. For ease of reference, unless the context indicates otherwise, references hereinafter that refer to the nosecone 310 include the attached fairing 315.

Figure 3C:
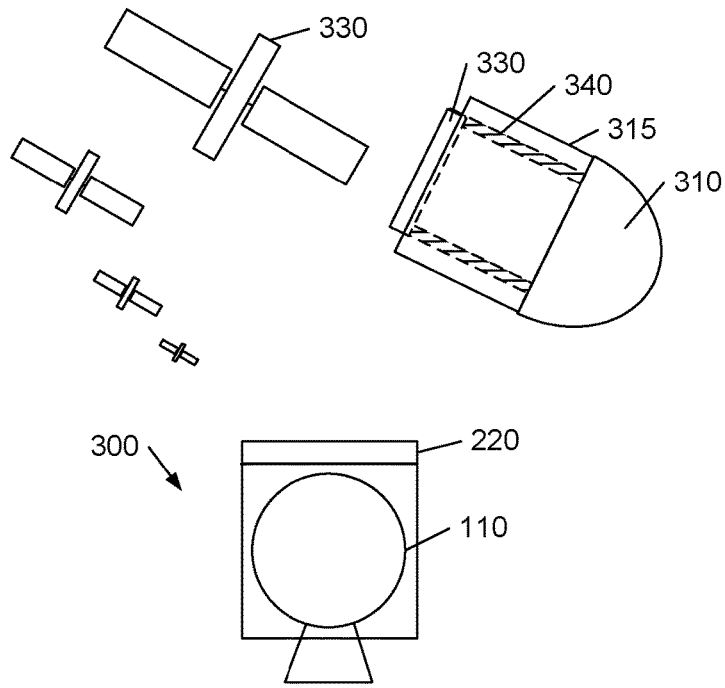

FIG. 3C illustrates the deployment of the payload elements 330. In this example, each payload element 330 is unscrewed from the rods 340 when the nosecone 310 arrives at the designated location for each payload element 330.

After deploying all of the payload elements 330, the nosecone 310 and/or the spacecraft 300 are maneuvered so as to situate the nosecone 310 at the engine-end of the spacecraft 300. The nosecone activates the motors of the rods 340 to securely attach the nosecone 310 to the spacecraft 300, thereby preparing the spacecraft 300 for re-entry as detailed above.

One of skill in the art will recognize that any of a variety of alternative techniques for deploying the nosecone 310 and the payload 330 may be employed. For example, in the aforementioned U.S. application Ser. No. 16/511,864, the example embodiments situate the motors for the rods 340 are in the final stage, such as parts of the auxiliary components 220, and the final stage controls the deployment of the payload 330 with no interaction with the nosecone 310. In this embodiment the nosecone 310 and the spacecraft 300 would use alternative means for securing the nosecone 310 to the engine-end of the spacecraft 300. In like manner, with the configuration illustrated in FIG. 3C, the nosecone 310 could discard the rods 340 and use alternative means for coupling to the spacecraft 300.

Figure 3D:
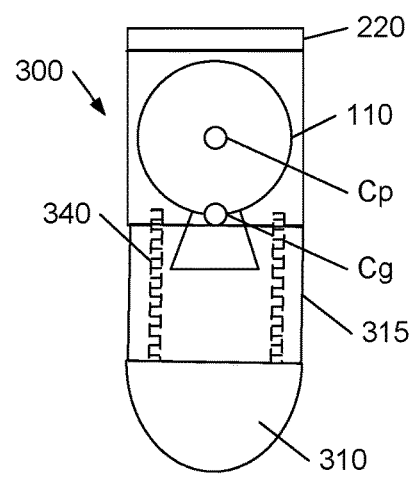

FIG. 3D illustrates the final configuration of the spacecraft 300 after the nosecone 310 and fairing 315 are coupled to the spacecraft 300. As in FIG. 2D, the nosecone 310 is now the lead element of the spacecraft 300 as the spacecraft 310 re-enters the atmosphere. Accordingly, the nosecone 310 comprises heat shielding material to protect the engine 110 and associate components. One of skill in the art will recognize that the nosecone 310 may be of a different shape than illustrated in FIG. 3D to provide additional heat shielding. This additional heat shielding may be provided by deploying panels to extend the cone-shape of the nosecone 310 to blanket more of the spacecraft 300. Optionally, a deployable heatshield 140 such as in FIG. 1D may be deployed from the nosecone 310.

As in the spacecraft 200 of FIG. 2D, this final configuration has a center of gravity Cg that is ahead of the center of pressure Cp in the direction of travel, and is therefore inherently stable and does not require continual orientation control.

As discussed above, the fairing 315 may comprise impact-absorbing material to protect the engine 110 from impact if the nosecone 310 is designed to continue to be the lead element of the spacecraft 300 when the spacecraft 300 lands. In this embodiment, the auxiliary components 220 may include parachutes and/or deployable panels that provide for gyroscopic stability and control, including autorotation to provide a controlled soft landing.

As also discussed above, a parachute may be deployed from the nosecone 310 to 'flip' the spacecraft 300 to a nosecone-up orientation after completion of the re-entry stage. In this embodiment, the auxiliary components 220 may include thrusters to provide a controlled soft landing.

The coupling of the nosecone 310 to the spacecraft 300 may include a 'bed' upon which the nosecone 310 attaches. This bed, for example, may be a spring-mounted surface on the spacecraft 300 through which the threaded rods 340 pass to allow the rods 340 to attach to the body of the spacecraft 300. This spring-loaded bed allows the nosecone 310 to 'tilt' relative to the remainder of the spacecraft 300. The threaded rods 340 may be used to adjust the tilt angle by selective tightening and loosening one or more of the rods 340, bringing the associated portion of the bed closer or further away from the remainder of the spacecraft 300. By tilting the nosecone 310 with respect to the remainder of the spacecraft 300, the center of gravity Cg will shift laterally relative to the center of pressure Cp. Because, absent other forces, the direction of travel is along the line from the center of pressure Cp to the center of gravity Cg, this shift of the center of gravity Cg relative to the center of pressure Cp will change the direction of travel. Consequently, in this configuration, the nosecone 310 is able to selectively change the direction of descent via the selective tightening and loosening of the threaded rods 340.

As detailed above, this invention solves a number of difficulties envisioned for the successful recovery of the final stage of a spacecraft. Of particular note, elements of this invention provide for the protection of the engine and other components in the final stage; provide an aerodynamically stable situation for reentry and landing; provide a fuel-efficient control of the spacecraft as it re-enters the atmosphere and subsequently lands; provide aerodynamic elements, such as parachutes and steerable panels, to assure a controlled soft landing; and provide impact absorption to protect the engine and other components of the final stage.

This invention does not directly address the need for additional fuel in the final stage of the launch vehicle to decelerate the spacecraft so that it descends toward the atmosphere. However, embodiments of this invention provide solutions to the other difficulties associated with the recovery of the final stage, and require minimal fuel for re-entry and subsequent controlled soft landing. It should be noted that the space industry may accept a substantial 'lag' time, perhaps a year or two, between the time of launch and the time of recovery, given that embodiments of this invention provide confidence that the recovery will be successful. That is, the space industry may recognize that "the final stage will be recovered, eventually". In this case, the amount of additional fuel that needs to be provided for deceleration of the final stage spacecraft need only be enough to assure that the spacecraft is traveling at a speed that is less than the speed necessary to remain in orbit, so that it will "eventually" fall to the re-entry altitude.

The foregoing merely illustrates the principles of the invention. It will thus be appreciated that those skilled in the art will be able to devise various arrangements which, although not explicitly described or shown herein, embody the principles of the invention and are thus within its spirit and scope.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of a combination of hardware portions (e.g., including discrete and integrated electronic circuitry) and software portions (e.g., computer programming).

f) hardware portions may include a processor, and software portions may be stored on a non-transitory computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A spacecraft comprising:
a volume that facilitates a payload;
a fairing that surrounds the volume to protect the payload;
a deployment system that enables deploying the payload in space;
an engine that propels the spacecraft and is situated at an engine-end of the spacecraft;
a nosecone that, when the spacecraft is launched, is at a nose-end of the spacecraft, wherein the nose-end and the engine-end are opposite ends of the spacecraft; and
a recovery system;
wherein the deployment system enables the nosecone to be released from the nose-end of the spacecraft;
wherein the recovery system enables the nosecone to be situated at the engine-end of the spacecraft after being released from the nose-end; and
wherein the recovery system secures the nosecone to the engine-end to provide protection to the engine.

2. The spacecraft of claim 1, wherein the nosecone provides a heat-shield that protects the engine upon a re-entry of the spacecraft to an atmosphere.

3. The spacecraft of claim 1, wherein some or all of the recovery system is situated in the nosecone.

4. The spacecraft of claim 1, comprising auxiliary components that facilitate landing the spacecraft with minimal damage to the engine.

5. The spacecraft of claim 4, wherein the auxiliary components include one or more deployable parachutes that provide a reduction in a rate of descent of the spacecraft.

6. The spacecraft of claim 4, wherein the auxiliary components include one or more deployable panels that provide aerodynamic stability to the spacecraft.

7. The spacecraft of claim 4, wherein the auxiliary components include one or more thrusters that provide a reduction in a rate of descent of the spacecraft.

8. The spacecraft of claim 1, wherein the nosecone is configured to deploy the payload after being released from the nose-end of the spacecraft.

9. The spacecraft of claim 1, wherein the recovery system includes one or more components that enable the nosecone to alter a direction of travel of the spacecraft when the nosecone is secured to the engine-end of the spacecraft.

10. The spacecraft of claim 9, wherein the nosecone alters the direction of travel by altering a center of gravity of the spacecraft relative to a center of pressure of the spacecraft.

11. The spacecraft of claim 1, wherein, when the nosecone is secured to the engine-end of the spacecraft, the recovery system orients the spacecraft to place the nosecone as a lead element of the spacecraft in a direction of travel as the spacecraft descends to earth's atmosphere.

12. The spacecraft of claim 11, wherein a center of gravity of the spacecraft is located ahead of a center of pressure of the spacecraft in the direction of travel.

13. The spacecraft of claim 1, wherein the payload is secured to the spacecraft using one or more threaded rods.

14. The spacecraft of claim 13, wherein the nosecone is secured to the nose-end of the spacecraft using the one or more threaded rods.

15. The spacecraft of claim 13, wherein the nosecone is secured to the engine-end of the spacecraft using the one or more threaded rods.

16. The spacecraft of claim 13, comprising one or more conduits within the one or more threaded rods.

17. The spacecraft of claim 13, wherein the one or more threaded rods are sectional.

18. The spacecraft of claim 13, wherein the one or more threaded rods enable a vertical assembly of the spacecraft.

19. A method comprising:
providing an engine of a spacecraft at an engine-end of the spacecraft;
coupling one or more payload elements to the engine;
coupling a nosecone to the payload element at nosecone-end of the spacecraft, opposite from the engine-end;
wherein:
the spacecraft includes:
a deployment system that enables deploying the payload elements in space; and
a recovery system;
wherein the deployment system enables the nosecone to be released from the nose-end of the spacecraft;
wherein the recovery system enables the nosecone to be situated at the engine-end of the spacecraft after being released from the nose-end; and
wherein the recovery system secures the nosecone to the engine-end to provide protection to the engine.

20. The method of claim 19, wherein the nosecone provides a heat-shield that protects the engine upon a re-entry of the spacecraft to an atmosphere.

21. The method of claim 19, wherein some or all of the recovery system is situated in the nosecone.

22. The method of claim 19, comprising auxiliary components that facilitate landing the spacecraft with minimal damage to the engine.

23. The method of claim 22, wherein the auxiliary components include one or more deployable parachutes that provide a reduction in a rate of descent of the spacecraft.

24. The method of claim 22, wherein the auxiliary components include one or more deployable panels that provide aerodynamic stability to the spacecraft.

25. The method of claim 22, wherein the auxiliary components include one or more thrusters that provide a reduction in a rate of descent of the spacecraft.

26. The method of claim 19, wherein the nosecone is configured to deploy the payload after being released from the nose-end of the spacecraft.

27. The method of claim 19, wherein the recovery system includes one or more components that enable the nosecone to alter a direction of travel of the spacecraft when the nosecone is secured to the engine-end of the spacecraft.

28. The method of claim 27, wherein the nosecone alters the direction of travel by altering a center of gravity of the spacecraft relative to a center of pressure of the spacecraft.

29. The method of claim 19, wherein, when the nosecone is secured to the engine-end of the spacecraft, the recovery system orients the spacecraft to place the nosecone as a lead element of the spacecraft in a direction of travel as the spacecraft descends to earth's atmosphere.

30. The method of claim 29, wherein a center of gravity of the spacecraft is located ahead of a center of pressure of the spacecraft in the direction of travel.

31. The method of claim 19, including securing the payload to the nosecone using one or more threaded rods.

32. The method of claim 31, including securing the nosecone to the nose-end of the spacecraft using the one or more threaded rods.

33. The method of claim 31, including securing the nosecone to the engine-end of the spacecraft using the one or more threaded rods.

34. The method of claim 31, wherein the threaded rods comprise one or more conduits within the threaded rods.

35. The method of claim 31, including assembling the threaded rods in sections that couple to each other.

36. The method of claim 31, including assembling the spacecraft in a vertical orientation, with the nose-end above the engine-end.

37. A method comprising:
providing an engine of a spacecraft at an engine-end of the spacecraft;
vertically coupling one or more payload elements above the engine;
vertically coupling a nosecone to an uppermost payload element of the one or more payload elements at a nosecone-end of the spacecraft;
wherein:
the vertical coupling comprises:
coupling the payload elements to the engine and nosecone using threaded rods;
selectively enabling a securing element in the payload elements that engages threads of the threaded rods; and
rotating the threaded rods to couple and preload each payload element;
providing a deployment system that enables deploying the payload elements in space;
wherein the deployment system deploys the payload elements by rotating the threaded rods in a direction opposite the rotation that coupled and preloaded the payload elements;
providing a recovery system;
wherein the deployment system enables the nosecone to be released from the nose-end of the spacecraft;
wherein the recovery system enables the nosecone to be situated at the engine-end of the spacecraft after being released from the nose-end; and
wherein the recovery system secures the nosecone to the engine-end to provide protection to the engine.

38. The method of claim 37, wherein the nosecone provides a heat-shield that protects the engine upon a re-entry of the spacecraft to an atmosphere.

39. The method of claim 37, wherein some or all of the recovery system is situated in the nosecone.

40. The method of claim 37, comprising auxiliary components that facilitate landing the spacecraft with minimal damage to the engine.

41. A method of recovering an engine of a spacecraft in space, wherein the spacecraft comprises the engine at an engine-end of the spacecraft and a nosecone at a nosecone-end of the spacecraft, the method comprising:
releasing the nosecone from the nosecone-end of the spacecraft;
situating the nosecone at the engine-end of the spacecraft;
securing the nosecone to the engine-end of the spacecraft;
enabling the spacecraft to descend toward earth;
deploying auxiliary components from the spacecraft to reduce a rate of descent of the spacecraft; and
using the auxiliary components to land the spacecraft;
wherein the nosecone at the engine-end of the spacecraft protects the engine from effects of re-entry into the atmosphere.

42. The method of claim 41, wherein the auxiliary components include one or more deployable parachutes that provide some or all of the reduction in the rate of descent of the spacecraft.

43. The method of claim 41, wherein the auxiliary components include one or more deployable panels that provide aerodynamic stability to the spacecraft.

44. The method of claim 41, wherein the auxiliary components include one or more thrusters that provide some or all of the reduction in the rate of descent of the spacecraft.

45. The method of claim 41, comprising enabling the nosecone to alter a direction of travel of the spacecraft when the nosecone is secured to the engine-end of the spacecraft.

46. The method of claim 45, wherein the nosecone alters the direction of travel by altering a center of gravity of the spacecraft relative to a center of pressure of the spacecraft.

47. The method of claim 41, comprising orienting the spacecraft to place the nosecone as a lead element of the spacecraft in a direction of travel as the spacecraft descends to earth's atmosphere.

48. The method of claim 47, wherein a center of gravity of the spacecraft is located ahead of a center of pressure of the spacecraft in the direction of travel when the nosecone is the lead element.

49. The method of claim 41, wherein the spacecraft includes a payload, and the method comprises deploying the payload into space after the nosecone is released from the nose-end of the spacecraft.

50. The method of claim 49, wherein deploying the payload comprises manipulating one or more threaded rods that coupled the payload to the spacecraft.

51. The method of claim 41, wherein releasing the nosecone from the nose-end of the spacecraft comprises manipulating one or more threaded rods that coupled the nosecone to the nose-end.

52. The method of claim 41, wherein securing the nosecone to the engine-end of the spacecraft comprises manipulating one or more threaded rods that coupled the nosecone to the nose-end.

* * * * *